United States Patent [19]

Drews

[11] Patent Number: 5,621,869
[45] Date of Patent: Apr. 15, 1997

[54] MULTIPLE LEVEL COMPUTER GRAPHICS SYSTEM WITH DISPLAY LEVEL BLENDING

[76] Inventor: Michael D. Drews, 7924 Showcase La., Sandy, Utah 84094-7234

[21] Appl. No.: 640,409

[22] Filed: May 28, 1996

Related U.S. Application Data

[63] Continuation of Ser. No. 267,585, Jun. 29, 1994, abandoned.

[51] Int. Cl.⁶ .................................................. G06F 15/00
[52] U.S. Cl. ............................................................ 395/135
[58] Field of Search .................................... 395/135, 155, 395/161; 345/113, 114

[56] References Cited

U.S. PATENT DOCUMENTS

| | | | |
|---|---|---|---|
| 4,954,970 | 9/1990 | Walker et al. | 395/135 |
| 4,979,130 | 12/1990 | Li et al. | 364/518 |
| 5,434,958 | 7/1995 | Sunma et al. | 395/135 |

*Primary Examiner*—Phu K. Nguyen
*Attorney, Agent, or Firm*—Darby & Darby, P.C.

[57] ABSTRACT

Image data is generated and stored for prioritized image levels of a composite graphics display along with certain control and blending data. To composite data levels for a display, individual picture elements (pixels) are generated in accordance with level priority, control signal indications of enablement, control signal indications of color and alpha control signals (object position and transparency). Accordingly, object data from plural levels is selected or blended on a pixel-by-pixel basis to accomplish a desired composite display.

6 Claims, 4 Drawing Sheets

MULTIPLE LEVEL COMPUTER GRAPHICS SYSTEM WITH DISPLAY LEVEL BLENDING

This application is a continuation of U.S. patent application Ser. No. 08/267,585 filed Jun. 29, 1994, now abandoned.

FIELD OF INVENTION

The present invention relates generally to computer graphics and more specifically to anti-aliased, multiple-level image systems in which levels of display data are combined to provide a composite picture image.

BACKGROUND AND SUMMARY OF THE INVENTION

Computer graphics systems are well known in many forms including video games, training simulators, modeling units, animated sequence generators and so on. Typically, computer graphics systems incorporate a display structure providing a light image, to give the viewer the impression of looking at a scene through a window. The display is somewhat like a television picture and over the years dynamic scenes with considerable realism have been attained.

Advanced computer graphics systems store basic forms (primitives), typically as part of a large data base. Picture content is then selected from the storage, oriented with respect to a viewpoint and processed to remove hidden surfaces. Individual fragments or picture elements (pixels) are then processed for a display.

Somewhat typically, prior to display, the pixel data is stored in a frame buffer for cyclic modification to accommodate dynamic displays. In synchronism with frame buffer modifications, pixels are scanned from the frame buffer, for example in a raster pattern, to drive a display device, e.g. a cathode ray tube structure.

It has been proposed to store data for several distinct image levels, representing independent pictures, or picture components for combination in a composite display. Typically, the level of highest priority takes precedence so that its picture content is dominant in the display. Thus, the display may be analogized to papers on a table. The highest priority level, or top paper is always visible. Conversely, lower priority levels are visible in descending order of priority, only if unobscured by higher priority levels. In multiple level display systems, the background is usually the lowest priority level.

To consider an exemplary multiple level or composite display, an aircraft might be depicted in flight passing clouds against a background of blue sky. In order of decreasing priority, the aircraft could be carried on an overlay layer (top), the clouds on a middle layer and the blue sky on an underlay. Although forms of such systems have been effectively used in the past, a need exists for improvement. Specifically, a need exists for improved images and increased flexibility.

Generally, to process data for individual picture elements (pixels), each of the objects contending to be represented in each pixel is considered with respect to position and transparency. Specifically, pixels are composed by considering the objects that are intersected by a ray extended from the eye point through the pixel. Typically, foremost objects are favored. However if the ray intersects two objects at a boundary, complications arise. If a choice favors either object, boundaries appear as jagged lines, as often viewed in television displays. Various anti-aliasing techniques have been proposed to avoid such jagged lines or edges in computer graphics displays. In general, the system of the present invention is based on recognizing the need for anti-aliasing operations to improve multiple layer displays. In a related context, a need also is recognized for flexibility in multiple-level computer graphics displays.

In accordance with the present invention, data for multiple display levels is generated by a graphics display system and stored for display by a picture generator. With the data stored, the picture generator selectively displays composite data from the multiple levels, on a pixel-by-pixel basis. Generally, contention for a pixel by individual objects is resolved on the basis of level priority (higher priority levels dominating over lower priority levels). In instances of boundary contention or transparency contention, pixels are shared by blending techniques to improve the display as by anti aliasing. Furthermore, the system of the disclosed embodiment incorporates control selectivity not only with regard to color but additionally with regard to level fragments. Consequently, an improved multiple level display system is provided affording substantial flexibility and improved displays.

BRIEF DESCRIPTION OF THE DRAWINGS

A complete understanding of the invention and its advantages can be gained from a consideration of the following description of the disclosed embodiment taken in conjunction with the accompanying drawings, in which.

DESCRIPTION OF THE ILLUSTRATIVE EMBODIMENTS

As required, detailed illustrative embodiments of the present invention are disclosed herein. However, physical graphics elements, logic structures and display apparatus in accordance with the present invention may be embodied in a wide variety of forms, some of which may be quite different from those of the disclosed embodiment. Consequently, the specific structural and functional details disclosed herein are merely representative, yet in that regard, they are deemed to afford the best embodiments for purposes of disclosure and to provide a basis for the claims herein which define the scope of the present invention.

Figure 1:
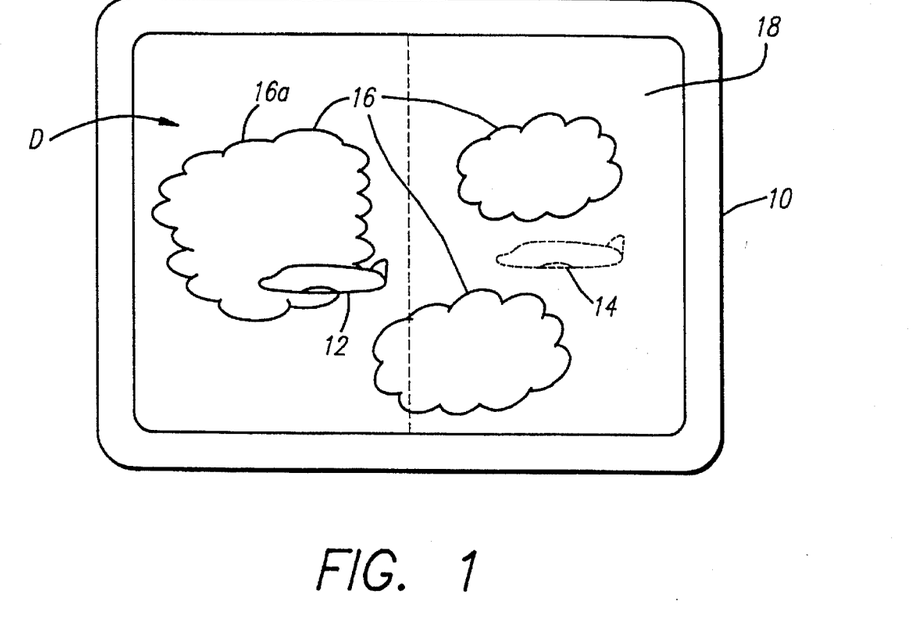
FIG. 1 is a pictorial view of a composite graphics display based on the system of the present invention.
Figure 2:
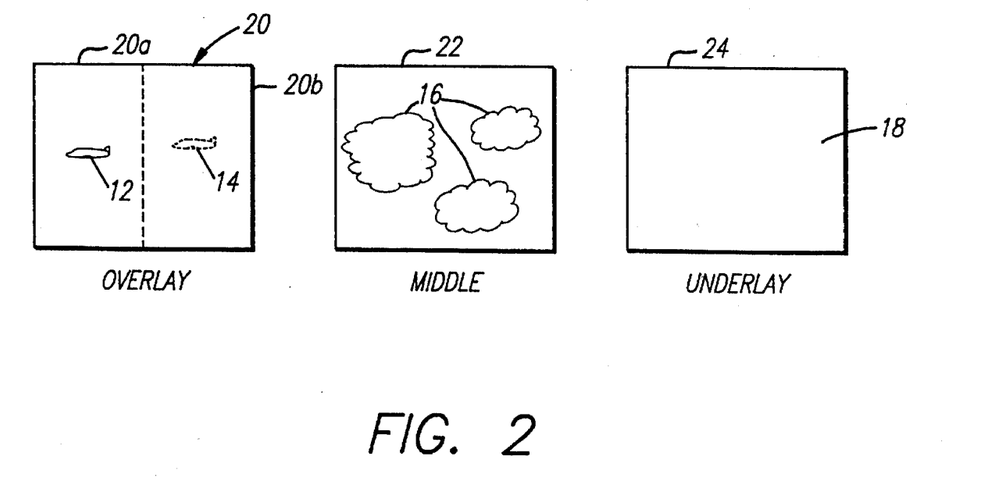
FIG. 2 is a pictorial view of a series of levels for the display of FIG. 1.

Referring initially to FIG. 1, a display unit 10 provides a display D revealing an aircraft 12 in solid lines (left) and an aircraft 14 in dashed lines. Behind the two aircraft 12 and 14, are clouds 16 obstructing a uniformly colored sky 18. Generally, in accordance herewith, the data for the aircraft 12 and 14 is carried on an upper layer (overlay) the clouds 16 on a middle layer (middle) and the sky 18 on a lower layer (underlay). The representative data for individual layers is represented in FIG. 2, specifically identified as an overlay 20, a middle 22 and an underlay 24. Compositing the three layers 20, 22 and 24 produces the display D (FIG. 1).

To illustrate a feature of selectivity, the overlay 20 is vertically divided into two fragments, 20a and 20b. As an example of selectivity, the fragment 20a may be enabled while the fragment 20b is disabled. Accordingly, the aircraft 14 selectively appears or does not appear in the display D (FIG. 1). Of course, a wide variety of fragmentations are possible to accomplish a wide variety of enabled and disabled fragments.

As another element of selectivity, color changes may be implemented rather simply in the individual layers. For example, in one sequence it may be desirable for the sky 18 to be blue while in another sequence a dark gray sky may be desired. Such flexibility is accommodated in the system as disclosed below.

To illustrate another aspect of the disclosed system, assume that the aircraft 12 (FIG. 1) is black while the cloud 16a is white. As a consequence, border line pixels between the aircraft 12 and the cloud 16a are susceptible to aliasing, resulting in a jagged border. However, in accordance with the disclosed embodiment, as more than one level may control the picture at any given location (pixel), anti-aliased images are possible.

Pursuing the example of a black aircraft 12 and a white cloud 16a, rather than representing border line pixels between the two objects as either black or white, in accordance herewith they may be represented as gray thereby avoiding a jagged boundary in the multiple level display system. The appearance of control data is provided to indicate the shade of grey from the blend.

Another instance of pixel blending occurs with respect to the transparency of objects. For example, portions of the clouds 16 may be characterized by various degrees of transparency. Accordingly, with the use of alpha control signals, pixels are blended, combining clouds of the middle 22 (FIG. 2) and the sky of the underlay 24.

To consider the system of the present invention in greater detail with respect to a physical embodiment, reference now will be made to FIG. 3. A graphics display system 30 (upper left) is illustrated with a picture generator 32 separately illustrated. The picture generator 32 incorporates a frame buffer 34 as designated and a display structure illustrated in detail, comprising the remaining and generally indicated by the numeral 36. The display structure ultimately includes a display unit 10 (lower right) for presenting a dynamic display. In a sense, the display structure 36 may be considered part of a traditional picture generator; however, to simplify the explanation, the frame buffer 34 and the structure 36 are separately illustrated.

Generally, elements for use as the graphics display system 30 are well known in the art along with structure for the picture generator 32. For example, a graphics processor incorporating a picture generator is disclosed in the book *Fundamentals of Interactive Computer Graphics* by Foley and Van Dam published in 1984 by Addison-Wesley Publishing Company (see page 412).

Figure 3:
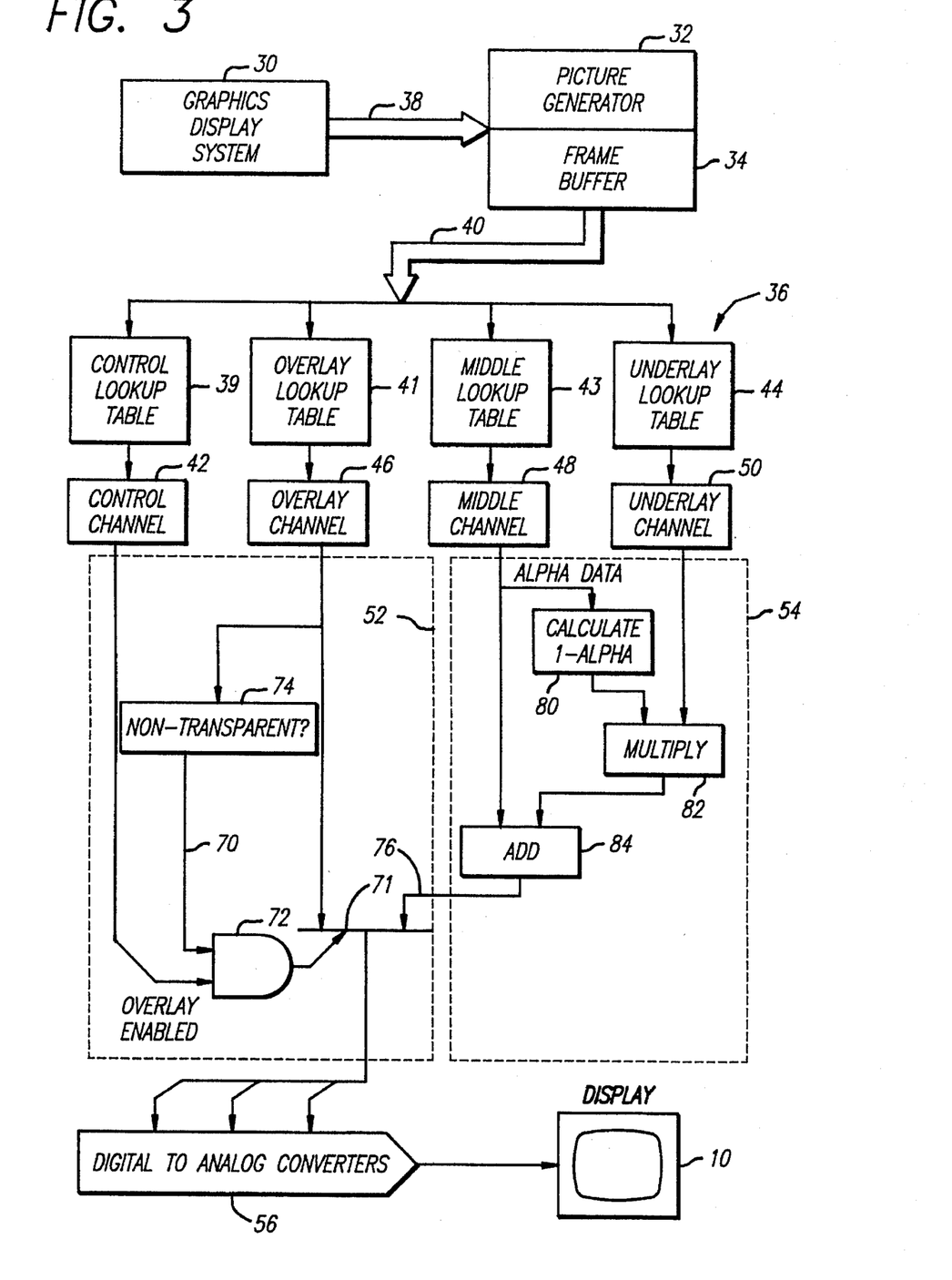
FIG. 3 is a detailed block diagram of a system in accordance with present invention as for providing the display of FIG. 1.

In the operation of the system as represented in FIG. 3, substantial data flows from the system 30 to the picture generator 32 as indicated by an arrow 38. In accordance with techniques of the prior art, data for multiple display levels are developed in the frame buffer 34, e.g. specifying an overlay 20 (FIG. 2), a middle 22 and an underlay 24.

In accordance with typical operations, the frame buffer 34 is scan converted to provide similarly positioned pixel data for each of the three layers. Specifically, separate data is provided from the frame buffer 34 through a channel 40 to lookup tables 39, 41, 43 and 44. Specifically the control lookup table 39 supplies a control channel 42 while the set 41, 43 and 44 of color tables are aligned to supply channels 46, 48, and 50, respectively for the overlay, the middle and the underlay.

Essentially, in the operation of the system, the frame buffer 34 provides data for the three levels along with control information for varying the display. The color lookup tables 41, 43 and 44 may be employed selectively to vary the color of individual layers. For example, as indicated above, the blue sky of the underlay 24 (FIG. 2) may be altered to a dark gray color. In such operation as well known in the art, color index signals replace color intensity signals. The index signals then address the desired color intensity signals stored in the color lookup tables 41, 43 or 44.

The control channel 42 affords the ability to enable and disable fragments of the layers depending on signals provided from the lookup table 39. For example, a command addressed from the lookup table 39 may disable the fragment 20b (FIG. 2) in the overlay 20, while enabling the fragment 20a, accordingly a single aircraft 12 is displayed. Thus, addressed control signals simply indicate "enable" or "disable" with regard to select areas.

Recapitulating to some extent, in accordance herewith, considerable flexibility is afforded in combining or compositing the individual layers. Specifically, fragments of layers may be treated as either enabled or disabled (control lookup table 39). Colors can be altered and contending areas of layers can be blended. As the system is illustrated in FIG. 3, an enable-disable unit 52 (left) controls the overlay from the channel 46 in accordance with the commands carried in the control channel 42. Concurrently, a blending unit 54 (right) blends individual pixel data appropriately, as received from the middle channel 48 and the underlay channel 50. The resulting display pixel data is merged in the unit 52 then is supplied to digital-analog converters 56 for driving the display unit 10 as well known in the art.

Considering the operation in greater detail, pixel data for the three levels is scan converted from the frame buffer 34 to be processed pixel-by-pixel in the display structure 36 for selectivity with respect to level, enablement and blending. As stated, the color lookup tables 41, 43 and 44 afford the possibility of modifying colors in the levels. In that regard, it is to be understood that three distinct color signals (intensity or control) are provided along with other control data and an alpha signal to express fractional area or transparency. Note that as illustrated, single lines in the enable-disable unit 52 and the blending unit 54 represent data flow paths accommodating separate color and alpha data. Thus, data is non destructively provided from the frame buffer 34. Ultimately, it is modified in accordance with control and format to provide three color signals to the digital to analog converters 56 and in turn provide drive signals for the display unit 10 resulting in a composite image picture.

Figure 4:
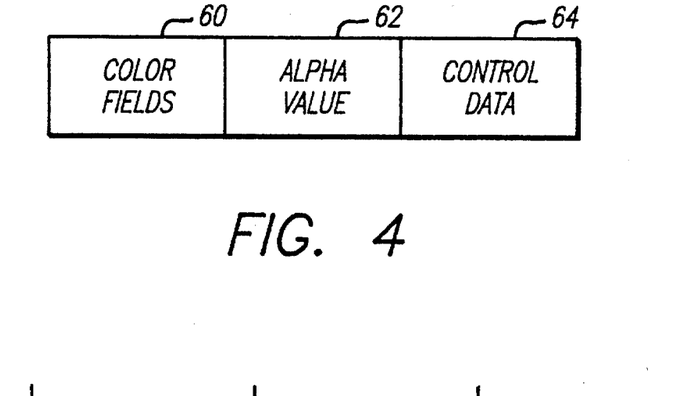
FIG. 4 is a diagrammatic representation illustrative of a data storage cell as utilized in the disclosed embodiment.

Data for each pixel provided from the frame buffer 34 is illustrated in FIG. 4 and includes color fields 60 indicating specific control or intensity data for red, green and blue colors at each pixel location. Additionally, an alpha value is provided in a field 62 to express fractional area or transparency. Alpha values may vary from 0.0 through 1.0, inclusive, ranging from full transparency to full opacity respectively, or alternatively, ranging from no coverage to full coverage respectively for a specific location. Thus, the red, green, blue and alpha values for a pixel, based on multiple contending levels, are combined to give a final intensity of red, green and blue colors by allowing the higher priority level to have a contribution to the pixel based on its alpha value and the lower priority level to have a contribution based on the inverse coverage or transparency of the higher priority level.

As indicated above, as an alternative to specific color indications in the color field 60, index data can be provided. That is, the color of a level for each location (pixel) may be determined from one or more values stored in the lookup tables 41, 43 and 44 (FIG. 3) which are addressed by the color index data. Essentially, a form of index color or pseudo-color representation simply involves addressing the lookup tables as an alternative to a direct color intensity representation. Note that individual image levels may be either pseudo color or direct color.

Another field 64 (FIG. 4) of the pixel data carries control data for the pixel and is supplied to the control channel 42 (FIG. 3). Basically, the control data indicates the manner in which the information or data contained in each of the three levels from frame buffer 34 is to be displayed. For example, as indicated above, fragments of a level may be designated as "enabled" or "disabled." Enabled fragments are displayed while disabled fragments are deleted or blanked in the unit 52. The fragmentary selection, as accomplished by the enable-disable unit 52 will now be considered in relation to the overlay 20 (FIG. 2) as provided from the overlay channel 46 (FIG. 3.)

It will be recalled that each of the layers 20, 22 and 24 may depict various objects, e.g. aircraft, clouds or sky. Also, at certain locations, layers may simply be blanked to transparent content. If an area is transparent, that is, has no content, no consideration or processing is required. Alternatively, if content exists, i.e. non-transparent, the data may be displayed subject to the pixels being enabled in accordance with control signals provided through the control channel 42 from the enable-disable control lookup table 39.

In one embodiment, the lookup table 39 simply affords an indication of "enable" or "disable" selected by the control data (field 64, FIG. 4). In that regard, the function of the enable-disable unit 52 is to provide pixel data representing the overlay unless the overlay is transparent or disabled. For enabled data, a binary gating signal is provided from the table 39 through the control channel 42 to an "and" gate 72. Another input to the "and" gate 72 is provided through a non-transparent test circuit 74 qualified when the overlay location has substance (non-transparent). Accordingly, if data exists for the location in the overlay and if the location is qualified for display, the "and" gate 72 passes a qualifying signal to a gate 71, providing the overlay signal from the overlay channel 46 to the digital-analog converter 56. That is, qualification of the "and" gate 72 actuates the gate 71 to pass the data from the overlay channel 46. Alternatively, if the gate 72 is not qualified, the data in a line 76 is passed to the converters 56.

As will be explained in detail below, the line 76 from the blending unit 54, carries a blend of pixel data representing the middle 22 and the underlay 24 (FIG. 2). The blending of the middle 22 and the underlay 24 in the unit 54 involves treating the representative signals from the middle channel 48 (FIG. 3) and the underlay channel 50 in accordance with the alpha data to accomplish a blend as treated in detail below.

For purposes of explanation, the display of FIG. 1, again will be considered with the middle 22 (clouds) being blended with the underlay 24 (sky) in accordance with alpha values for the middle 22. Generally, as explained above, the middle level is computed to have red, green, blue and alpha values at each location. The alpha value at each location is a fractional area or opacity at that location and the red, green and blue values are the product of the object (clouds) being represented by the middle and the fractional area or opacity of that object. Essentially, the blending unit 54 calculates the inverse coverage (inverse opacity) or transparency of the middle level based on the alpha value and multiplies the result by the red, green and blue color intensity values from the underlay level for each pixel location. The products are added to the red, green and blue color intensity values from the middle level to give the final color intensity value.

As indicated above, the resulting blended intensity value is selectively passed to the converters 56 (gate 71) for conversion to a voltage level for driving the display unit 10 to attain the desired color intensities. The accomplishment of the color may be treated somewhat explicitly in a mathematical format. Preliminarily consider some notations.

The notation "Red(underlay)" refers to the value of red color information for the underlay level, "Red(middle)" refers to the value of red color information for the middle level, and "Red(final)" refers to the composite of the underlay and middle levels of red color.

In a similar fashion, "Grn(underlay)" refers to the value of green color information for the underlay level, "Grn(middle)" refers to the value of green color information for the middle level, and "Grn(final)" refers to the composite of the underlay and the middle levels of the green color. "Blu(underlay)" refers to the value of blue color information for the underlay level, "Blu(middle)" refers to the value of blue color information for the middle level and "Blu(final)" refers to the composite of the underlay and the middle levels of blue color.

The designation "Alpha(middle)" refers to the value of alpha or opacity information for the middle level. Accordingly, the mathematical equations for pixel-by-pixel combining of the two levels (middle and underlay) are:

Red(final)=Red(middle)+(1−Alpha (middle))\*, Red (underlay).

Grn (final)=Grn (middle)+(1−Alpha (middle))\*, Grn (underlay).

Blu (final)=Blu (middle)+(1−Alpha (middle))\*, Blu(underlay).

The blending unit 54 (FIG. 3) implements the above equations. Specifically, from the middle channel 48, the alpha data is supplied to a calculate unit 80 for determining the value of "1−alpha". Thus a signal representative of that value is supplied to a multiply circuit 82 which also receives the component color values from the underlay channel 50. The signal-represented product from the multiply circuit 82 is passed to an add circuit 84, which also receives the color values of the middle level from the middle channel 48. Accordingly, the equations are implemented in that the middle values are additively combined with fragments of the underlay values dependant on the inverse fraction of alpha. The resulting blended values from the add circuit 84 are supplied through the line 76 to the gate 71 for alternative passage to the converters 56.

In view of the above description, it will be apparent that individual layers may be partially displayed, changed in color, or blended with other layers as in the case of contention for pixels. Accordingly, considerable flexibility is afforded in the composite display. To illustrate the process graphically, reference now will be made to FIG. 5, indicating the manner in which pixel data L1 and L2 from two individual layers may or may not be blended.

Figure 5:
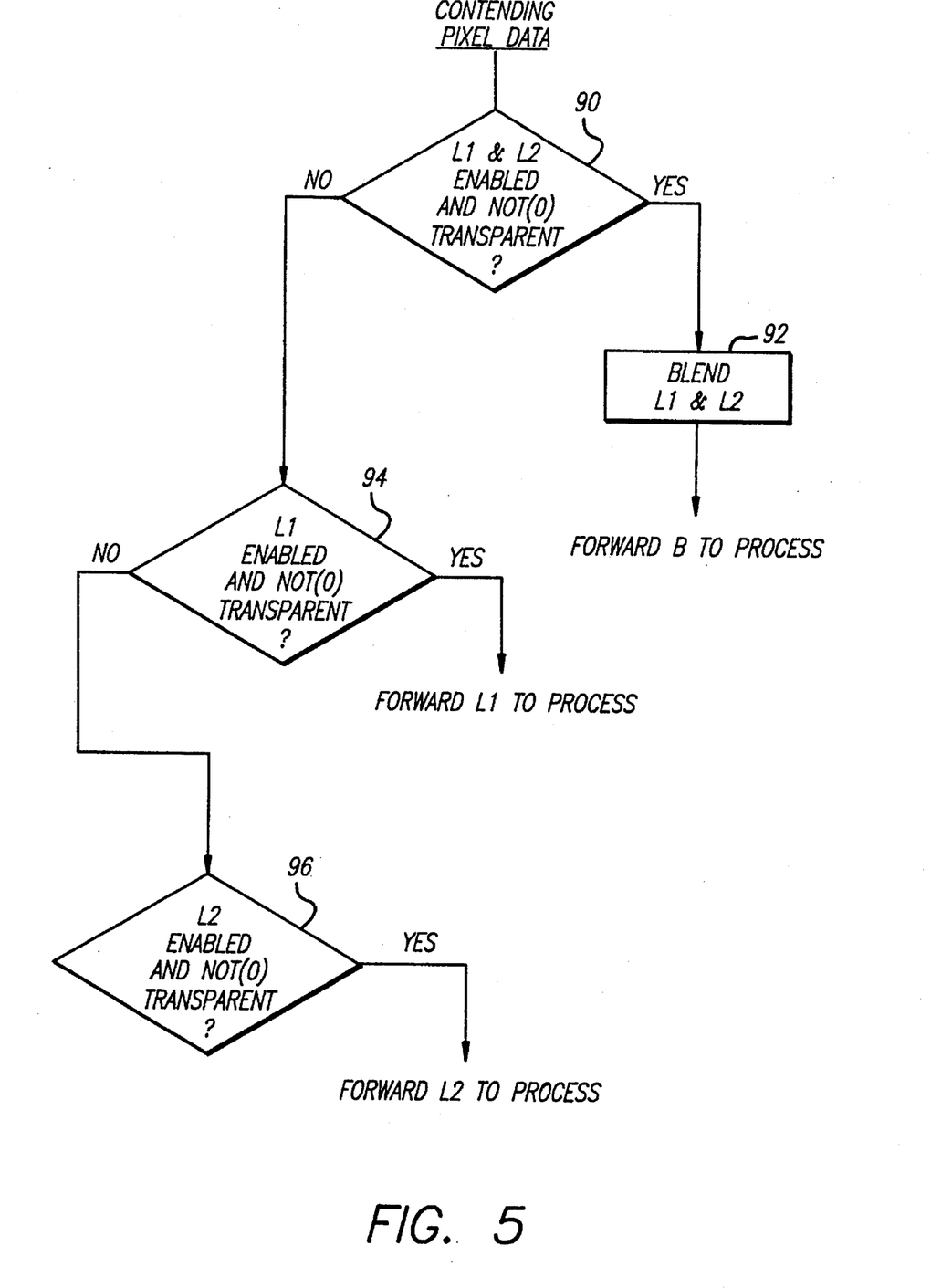
FIG. 5 is a flow diagram indicating a process for a system in accordance with the present invention.

At the outset of the process, a determination is made, as represented by the query block 90, of whether or not both levels L1 and L2 are enabled and "not zero" or not transparent. If the determination is positive, i.e. levels L1 and L2 are both enabled and "not transparent," the process proceeds to the blending operation as indicated by the block 92 as arithmetically defined above.

Conversely, if the information for a specific area does not represent both level L1 and L2 to be enabled and "not transparent," the process proceeds from the query block 90 to a query block 94, i.e. whether L1 is enabled and "not transparent." If the resolution is affirmative, the system proceeds, passing the L1 data for further processing, i.e. either for further consideration with another level or for display.

If the location data for L1 either is "not enabled" or is transparent (zero), the process proceeds to a query block 96, affording similar treatment for the data of level L2. Specifically, if the location is enabled and "not transparent," the data is forwarded to advance the process. Otherwise, no consequence exists.

In addition to combining a pair of levels, an arbitrary number of levels could be combined, using the results of blended lower levels for combination with a next higher level. A notation for combining three levels is somewhat similar to that used for combining two levels for Red (final), Grn (final), and Blu (final). The mathematic equations for combining three levels are:

Red (final)=Red (overlay)+(1−Alpha (overlay))* (Red (middle)+
(1−Alpha (middle)) * Red (underlay))

Grn (final)=Grn (overlay)+(1−Alpha (overlay)) * (Grn (middle)+
(1−Alpha (middle)) * Grn (underlay))

Blu (final)=Blu (overlay)+(1−Blu (overlay)) * (Blu (middle)+(1−
Alpha (middle)) * Blu (underlay))

To expand on the above equations, any number of levels could be combined using the methods herein. Given n+1 levels, numbered zero through n, in order of increasing priority, the level zero being the last priority and the level n being the highest priority, the final colors can be calculated. For such an application, the notation "CmpRed(0)" refers to the composite of level zero for the red part of the color information. "CmpRed(1)" refers to the composite of levels one and zero for the red part of the color information. "CmpRed(2)" refers to the composite of levels 2, 1, and 0 for the red part of the color information and accordingly, "CmpRed(n)" refers to the composite of levels n through 0 for the red part of the color information inclusive. Similar notation is representative of the green color components and the blue color components. With this notation, the compositing calculations implemented in apparatus are as follows:
If n is 0, CmpRed(0)=Red(0)

CmpGrn (0)=Grn (0)

CmpBlu (0)=Blu (0);

Otherwise,

CmpRed (n)=Red (n)+(1−Alpha (n)) * CmpRed (n−1)

CmpGrn (n)=Grn (n)+(1−Alpha (n)) * CmpGrn (n−1)

CmpBlu (n)=Blu (n)+(1−Alpha (n)) * CmpBlu (n−1)

Figure 6:
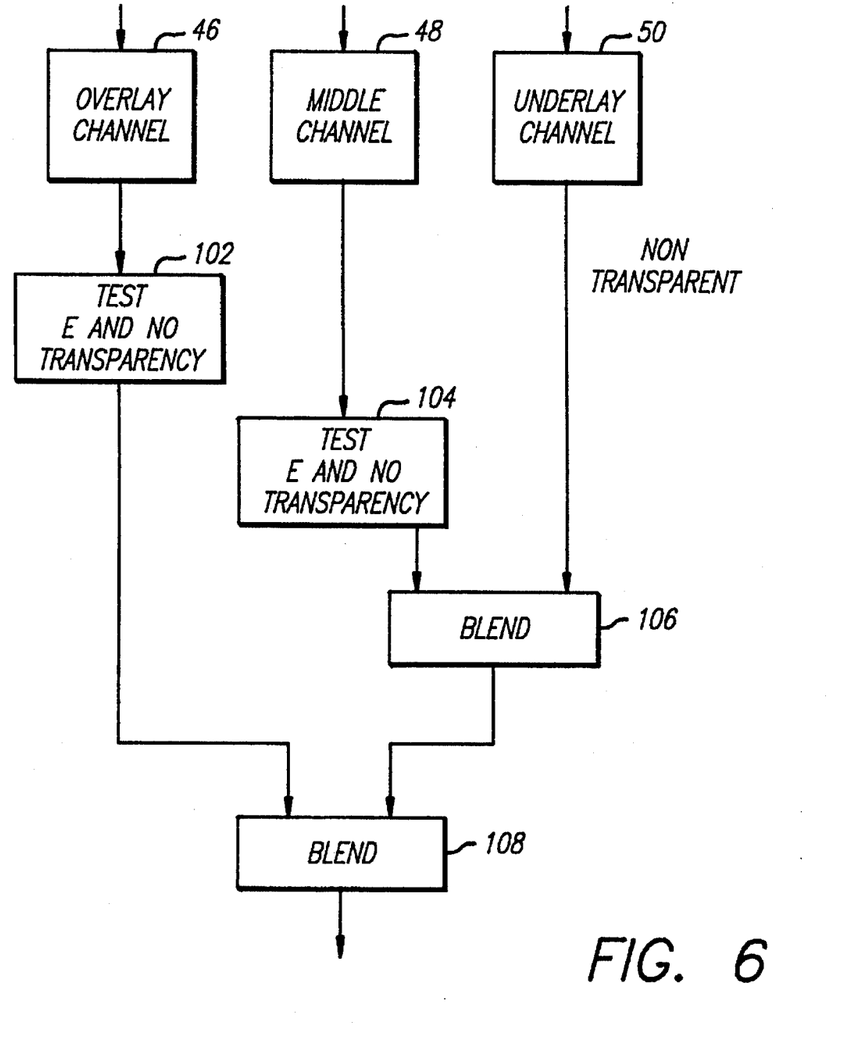
FIG. 6 is a block diagram of an alternative embodiment in accordance with the present invention.

Various combinations of enable-disable units, as the unit 52 (FIG. 3) and blending units (as the unit 54) may be accomplished for multiple selection and blend combinations. A form of structure is illustrated in FIG. 6 showing the overlay channel 46 (top), the middle channel 48 and the underlay channel 50. The underlay and middle are blended by the blend unit 106 and the result of that blend is blended with the overlay by the blend unit 108. As explained, blending depends on the lack of transparency.

Enable-disable test units 102 and 104 are coupled to the overlay channel 46 and middle channel 48 respectively. The circuits 102 and 104 may take the form of the enable-disable unit 52 of FIG. 3, incorporating a test circuit 74 for transparent signal indications, and a control gate. Additionally, a pair of blending units 106 (FIG. 6) and 108 are provided for blending levels of increasing priority. Specifically, blending unit 106 receives signals representative of the underlay from the underlay channel 50 for selective blending with signal representations of the middle as received from the channel 48. The resulting blend is provided from the blending unit 106 to the blending unit 108 for selective combination with the overlay utilizing the blending techniques as explained above. The signals from the blend unit 108 are provided to the converters 56 (FIG. 3) as explained above. Thus, multiple blending operations are accomplished along with image selectivity and color selection.

In view of the above explanation of exemplary systems, it will be appreciated that other embodiments of the present invention may be employed in various applications to accomplish composite displays with selectively varying content. While certain exemplary operations have been treated herein with detail and structures have been disclosed and described, the appropriate scope hereof is deemed to be in accordance with the claims as set forth below.

What is claimed is:

1. A picture display system for producing composite-image displays including a graphics unit for producing multiple level graphics display data including control signals comprising:

a frame buffer for storing said multiple level graphics display data as prioritized pixel data to represent multiple image levels, including overlay level pixel data, middle level pixel data, underlay level pixel data and said control signals;

a logic system for receiving said prioritized pixel data to resolve priority for individual pixels and including a blending unit for blending said middle level pixel data and said underlay level pixel data to provide blended pixel data in accordance with said prioritized pixel data, and an enable unit for controlling said overlay level pixel data in accordance with said control signals to provide enabled overlay level pixel data;

a data selector for providing said blended pixel data as final display data in the absence of said enabled overlay level pixel data, otherwise providing said enabled overlay level pixel data as final display data; and a display structure for receiving said final display data to provide said composite-image displays.

2. A picture generator according to claim 1 wherein said prioritized pixel data includes alpha data representative of the transparency of pixels in said multiple levels and said logic system blends said prioritized pixel data in accordance with said alpha data.

3. A picture generator according to claim 1 wherein said logic system includes a multiply unit and an add unit to blend said prioritized pixel data.

4. A picture display system according to claim 1 wherein said frame buffer stores pixel color data, pixel alpha values and pixel control data and wherein said pixel color data includes color index data for providing alternative pixel color data.

5. A picture display system according to claim 4 further including look up table means coupled to be addressed by said color index data for providing said alternative pixel color data.

6. A picture display system according to claim 1 further including means for fragmenting said multiple image levels.

* * * * *

UNITED STATES PATENT AND TRADEMARK OFFICE
CERTIFICATE OF CORRECTION

PATENT NO. : 5,621,869
DATED : April 15, 1997
INVENTOR(S) : Michael D. Drews

It is certified that error appears in the above-identified patent and that said Letters Patent is hereby corrected as shown below:

```
On the Title page, insert item --[73] Assignee: Evans & Sutherland

Computer Corporation, Salt lake City, UT--.
```

Signed and Sealed this

Twenty-fifth Day of November, 1997

Attest:

BRUCE LEHMAN

*Attesting Officer*     *Commissioner of Patents and Trademarks*